Nov. 24, 1925. 1,563,140
G. G. VON ARCO
ARRANGEMENT FOR CONTROLLING THE DRIVING MOTORS IN HIGH FREQUENCY MACHINES
Filed Aug. 3, 1922
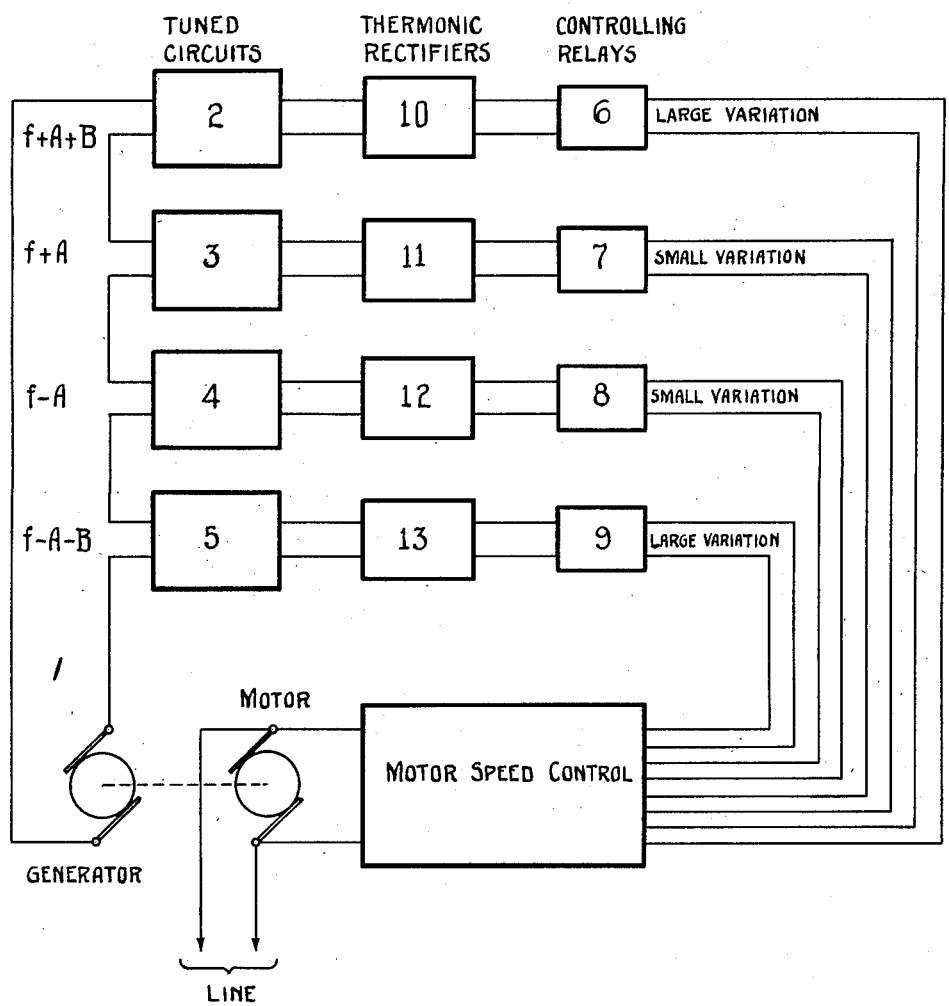
Inventor
GRAF GEORG VON ARCO
By his Attorney
Ira J. Adams Patented Nov. 24, 1925.

1,563,140

UNITED STATES PATENT OFFICE.

GRAF GEORG von ARCO, OF BERLIN, GERMANY, ASSIGNOR TO GESELLSCHAFT FÜR DRAHTLOSE TELEGRAPHIE M. B. H., OF BERLIN, GERMANY, A CORPORATION.

ARRANGEMENT FOR CONTROLLING THE DRIVING MOTORS IN HIGH-FREQUENCY MACHINES.

Application filed August 3, 1922. Serial No. 579,502.

*To all whom it may concern:*

Be it known that I, GRAF GEORG VON ARCO, a citizen of the Republic of Germany, and a resident of Hallesches Ufer 12/13, Berlin, S. W. 11, Germany, have invented new and useful Improvements in Arrangements for Controlling the Driving Motors in High-Frequency Machines (for which I have filed an application in Germany Aug. 2, 1921), of which the following is a specification accompanied by drawings.

The necessity of providing means for controlling the rotation of high frequency machines is well known. In order fully to utilize the modern, wide-range, selecting means provided in the receiver, it is necessary to have an exceptionally constant frequency.

Generally speaking, the principle of controlling the rotation of the driving motors of high frequency machines consists in using the "normal circuit," e. g., in the form of an oscillating circuit which contains only constant values such as, for example, C, L and W and which is brought into function in case of an increase in the frequency of the machine caused by variations in the rotation. If in addition to this, such a sensitive means as, for example, the so called "phase leap" is used together with cathode tubes as rectifier and amplifier in order to obtain in response to the slightest phase displacement direct current of varying direction and strength, a very sensitive indicating apparatus is obtained. Notwithstanding this a further difficulty is encountered in connecting the very sensitive indicating arrangement with the driving motor as an operative regulator. A polarized relay which is actuated by the varying direct current has been used in the past for actuating high potential current switches for the purpose of controlling the driving motor in such a manner that its speed of rotation remains the same even in case there are variations in the current supply. This is possible as long as the variations in the current supply remain within certain limits. However, if these variations exceed certain predetermined limits, the correcting stages will no longer suffice for speeding up and slowing down the motor, and if they are made great enough to be sufficient, then the difficulty arises that these large stages are continuously switched in and out when the machine varies from its normal speed of rotation. The correcting of the switches is too strong, and on account of this the switches must be made to stand strong currents and will therefore be very heavy. Due to this they will have a considerable time constant and operate sluggishly. This has been remedied by connecting in parallel with the controlling relay a time relay which will be actuated when the controlling relay remains in the same position for a period of time longer than the period of the time relay, that is to say, when the attempted correction does not produce the desired change in the speed of rotation of the motor for a period longer than that of the time relay. By means of this time relay a larger resistance value is connected in and out of the circuit.

However, this arrangement has the disadvantage that it takes too long a time to make the large corrections which correspond to strong fluctuations in the current supply and during this time the speed of rotation of the machine is left uncorrected.

The purpose of the present invention is to provide a regulation which operates with greater speed, i. e., a cascade regulation.

The single figure of the drawing represents schematically the arrangement of the apparatus according to my invention.

Referring to the drawing a radio frequency generator is shown suitably coupled to a driving motor. Coupled to an output circuit 1 of the generator are tuned circuits 2, 3, 4 and 5, each circuit being tuned to a different frequency which differs from the normal frequency at which it is desired the generator shall run. Connected to tuned circuits 2, 3, 4 and 5 thru thermionic rectifiers 10, 11, 12, and 13 are controlling relays 6, 7, 8 and 9.

Assuming that the frequency at which it is desired to maintain the generator is equal to $f$ then tuned circuit 3 is tuned to frequency $f+A$, where A is a relatively small amount and the circuit 2 is tuned to frequency $f+A+B$, where B may be larger than A. Similarly circuit 4 is tuned to frequency $f-A$ and circuit 5 is tuned to frequency $f-A-B$.

When the speed of the generator corresponds to the frequency of any one of the tuned circuits, a resonant current will be set up in that circuit which current when rectified by the thermionic rectifier, connected to the particular tuned circuit, will be sufficient to operate the particular controlling relay corresponding to the particular tuned circuit. These relays control, in any suitable manner, the speed of the driving motor. Relay 7, when operated, effects the motor speed control to tend to slow down the motor to a relatively small extent. Relay 6, when operated, effects the motor speed control to tend to slow down the motor to a relatively greater extent. Similarly, when relay 8 is operated, the motor speed tends to increase to a relatively small extent and when relay 9 is operated, the motor speed tends to increase to a relatively greater extent.

The operation of my invention is as follows: Assume that the generator is running at desired frequency $f$ when, due to some cause, as a change in the generator load or a change in the voltage supplying the driving motor, the frequency increases a small amount equal to A. Tuned circuit 3 which is tuned to the increased frequency will then supply sufficient current to operate relay 7. Relay 7 will immediately operate on the motor speed control to tend to force the motor speed to decrease by a small amount. In other words the change in the motor speed control mechanism will be a small one.

If the cause which compelled the frequency to increase was of small effect, no further operation of relays will result, but when the cause is removed, the relay 7 will be released and the motor control will go back to normal condition. But, if the disturbing cause is a sufficiently large one, then the adjustment of the motor control caused by operation of relay 7 is not sufficient to bring back the frequency to normal and the frequency will continue to increase till it reaches a value equal to $f+A+B$.

When the generator reaches the frequency $f+A+B$, tuned circuit 2, which is tuned to this new frequency, will supply sufficient current to operate controlling relay 6. Relay 6 immediately operates on the motor speed control in such a way as to slow down the motor sufficiently to bring it back to normal speed. In other words, the change in the motor control mechanism will be a relatively large one.

Similarly if the frequency decreases from normal due to any cause, the tuned circuits 4 and 5, rectifiers 12 and 13 and controlling relays 8 and 9 will be brought into play to speed up the motor, the tuned circuit 4 responding to a relatively small decrease in speed and the relay 8 causing a corresponding relatively small change in the motor speed control; and the tuned circuit 5 responding to a relatively larger decrease in speed and causing a relatively larger change in the motor speed control.

It will be appreciated that the detuning of circuits 2, 3, 4 and 5 from the normal frequency and the sensitivity of relays 6, 7, 8 and 9 may be so adjusted that small variation relays 7 and 8 will continue to be operated even though relays 6 and 9 have also been operated.

It will be seen that the small variation relays 7 and 8 which switch in and out comparatively small amounts of energy will be operated comparatively frequently to keep the desired normal frequency; whereas, the large variation relays 6 and 9, which switch in and out comparatively large amounts of energy will be operated comparatively infrequent but when the need for their operation arises, immediately.

Having described my invention, what I claim is:

1. An arrangement for controlling the driving motor of a high frequency machine comprising independent tuned circuits coupled to the output circuit of the high frequency machine, one tuned circuit being tuned to a frequency differing from the normal frequency by a relatively small amount, another tuned circuit being tuned to a frequency differing from the normal frequency by a relatively large amount, apparatus controlled by said first mentioned tuned circuit for changing the motor speed by a relatively small amount towards normal and apparatus controlled by said second mentioned tuned circuit for changing the motor speed by a larger amount towards normal.

2. An arrangement for controlling the driving motor of a high frequency machine comprising independent tuned circuits coupled to the output circuit of the high frequency machine, certain of which are tuned to frequencies differing from the normal frequency by relatively small amounts and another of which is tuned to a frequency differing from the normal frequency by a relatively large amount, relays, each of which is connected to a tuned circuit, rectifiers, each of which is interposed between a tuned circuit and its connected relay, a motor-speed control, said motor-speed control being regulated by said relays so as to effect a fine variation in motor-speed when one of the relays controlled by the first mentioned tuned circuits operates, and to correct a relatively large variation in motor speed when the relay connected to the last mentioned tuned circuit operates.

3. An arrangement for controlling the driving motor of a high frequency machine comprising means immediately responsive to a relatively small frequency change for changing the speed of the motor by a relatively small amount toward normal speed, and means immediately responsive to a relatively large frequency change only, for changing the speed of the motor by a larger amount toward normal speed.

4. An arrangement for controlling the driving motors in high frequency machines comprising a transmission conductor, circuits coupled to the transmission conductor, said circuits including a plurality of circuits tuned to frequencies less than the frequency which it is desired to transmit from said conductor and also including a plurality of circuits tuned to frequencies greater than that which it is desired to transmit from said conductor and certain of said pluralities of circuits being detuned with respect to the desired frequency to a less extent than another of said circuits, means controlled by the circuits which are detuned to the least extent from the desired frequency for effecting fine regulation of the speed of the motor and means controlled by the circuits which are detuned to the largest extent from the desired frequency for effecting coarse regulation of the speed of the motor.

5. An arrangement for controlling the driving motor of a high frequency machine comprising independent tuned circuits coupled to the output circuit of said high frequency machine, one tuned circuit being tuned to a frequency differing from the normal frequency of said machine by a relatively small amount and another tuned circuit being tuned to a frequency differing from the normal frequency of said machine by a larger amount, separate relays controlled by said circuits and apparatus independently controlled by said relays for changing the motor speed to different degrees corresponding to the deviation of the speed from normal.

GRAF GEORG v. ARCO.